United States Patent
Tsukagoshi

(10) Patent No.: US 8,995,970 B2
(45) Date of Patent: *Mar. 31, 2015

(54) MULTICAST COMMUNICATION METHOD IN A CDMA MOBILE COMMUNICATION SYSTEM

(75) Inventor: Tsutomu Tsukagoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,227

(22) Filed: Jul. 5, 2012

(65) Prior Publication Data

US 2012/0307705 A1    Dec. 6, 2012

Related U.S. Application Data

(60) Continuation of application No. 11/790,181, filed on Apr. 24, 2007, now Pat. No. 8,249,567, which is a division of application No. 11/357,985, filed on Feb. 22, 2006, now Pat. No. 7,215,948, which is acontinuation of application No. 10/397,524, filed on Mar. 27, 2003, now abandoned, which is a continu- (Continued)

(30) Foreign Application Priority Data

Dec. 7, 1998    (JP) ..................................... 10-347549

(51) Int. Cl.
*H04M 3/42*    (2006.01)
*H04W 72/00*    (2009.01)
(Continued)

(52) U.S. Cl.
CPC ........... *H04W 72/005* (2013.01); *H04L 12/185* (2013.01); *H04L 12/189* (2013.01);

(Continued)

(58) Field of Classification Search
USPC ...................... 455/414.2, 456.3, 435.1, 435.3
See application file for complete search history.

(56) References Cited

U.S. PATENT DOCUMENTS 5,555,446 A    9/1996    Jasinski
5,694,388 A    12/1997    Sawahashi et al.
(Continued)

FOREIGN PATENT DOCUMENTS

JP    10-107770    4/1998

OTHER PUBLICATIONS

Global System for Mobile Communications, "3$^{rd}$ Generation Partnership Project; Technical Specification Group Services and System Aspects; Multimedia Broadcast/Multicast Service (MBMS); Architecture and functional description," 3CPP TR 23,845,1.0(Dec. 2002) Tech. Report, pp. 1-114.

*Primary Examiner* — Quynh Nguyen
(74) *Attorney, Agent, or Firm* — Foley & Lardner LLP

(57) ABSTRACT

A multicast communication method in a CDMA mobile communication system is disclosed, which is capable of reducing a transmission power in a base station system and performing an efficient multicast operation for a large number of mobile subscribers is provided. Starting of information distribution by a multicast operation and identification of information indicating content are notified through a broadcast channel to a mobile subscriber. Through the broadcast channel, information necessary for actual reception of communication data is notified. In the mobile subscriber, a surround environment of the mobile subscriber is checked to determine the possibility of simultaneous receiving from a plurality of other base station systems. If possible, similar notified information is also received from other base station systems. Thus, all kinds of information regarding the spread code or the like to be used for receiving distributed information are obtained.

13 Claims, 3 Drawing Sheets

Related U.S. Application Data ation of application No. 09/456,377, filed on Dec. 7, 1999, now Pat. No. 6,542,755.

(51) Int. Cl.

| | | |
|---|---|---|
| *H04L 12/18* | (2006.01) | |
| *H04W 4/06* | (2009.01) | |
| *H04W 76/00* | (2009.01) | |
| H04B 1/7115 | (2011.01) | |
| H04W 4/08 | (2009.01) | |
| H04W 88/18 | (2009.01) | |

(52) U.S. Cl.
CPC ............. *H04W 4/06* (2013.01); *H04W 76/002* (2013.01); *H04B 1/7115* (2013.01); H04B *2201/70702* (2013.01); *H04W 4/08* (2013.01); *H04W 88/184* (2013.01); *Y02B 60/50* (2013.01)
USPC .................. 455/414.2; 455/456.3; 455/435.1; 455/435.3

(56) References Cited

U.S. PATENT DOCUMENTS

| | | |
|---|---|---|
| 5,877,252 A | 3/1999 | Tsujimoto et al. |
| 5,905,718 A | 5/1999 | Kurokami et al. |
| 6,272,148 B1 | 8/2001 | Takagi et al. |
| 6,333,921 B1 | 12/2001 | Grube et al. |
| 6,434,396 B1 | 8/2002 | Rune |
| 6,470,188 B1 | 10/2002 | Ohtani et al. |
| 6,473,411 B1 | 10/2002 | Kumaki et al. |

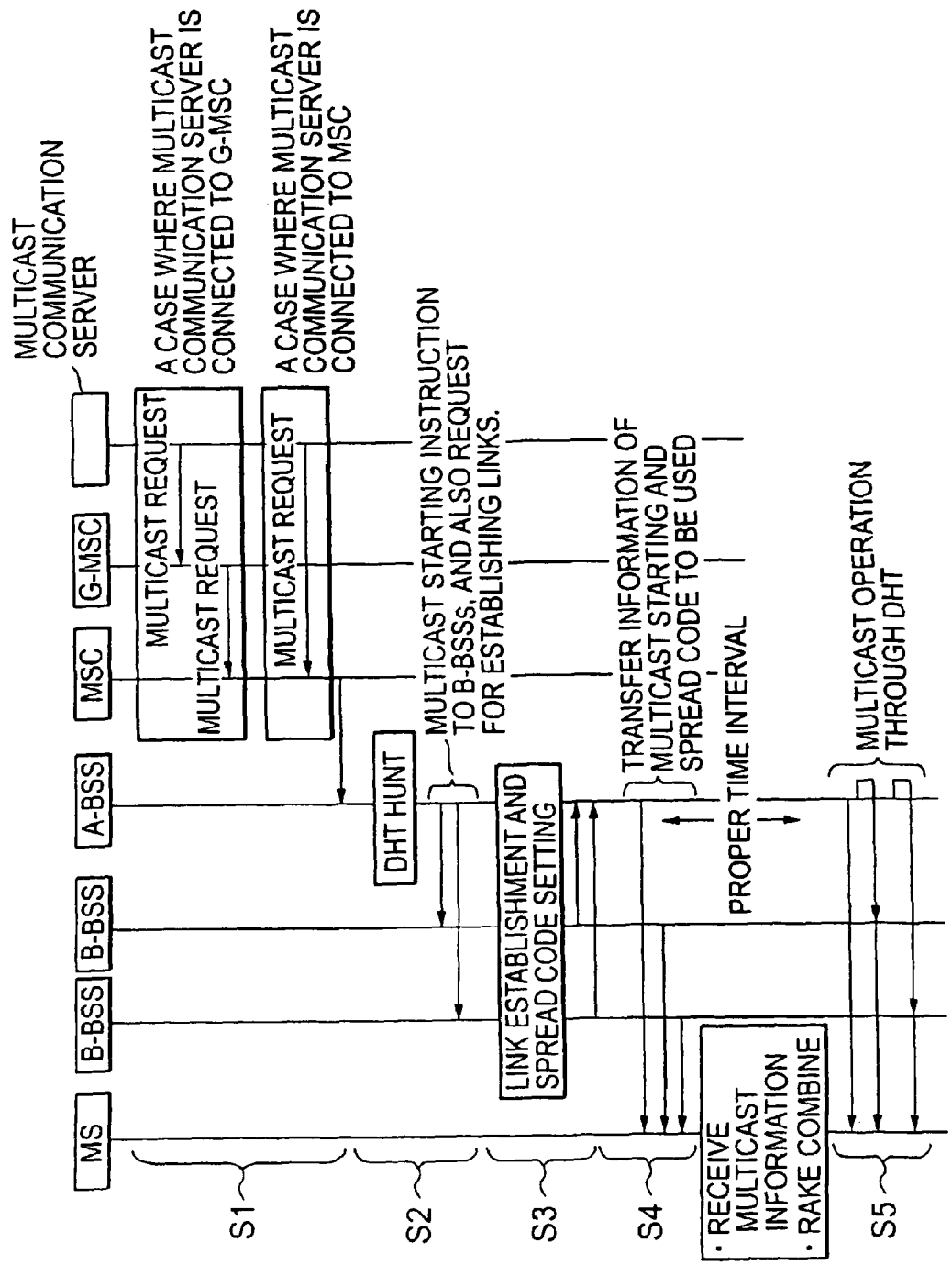

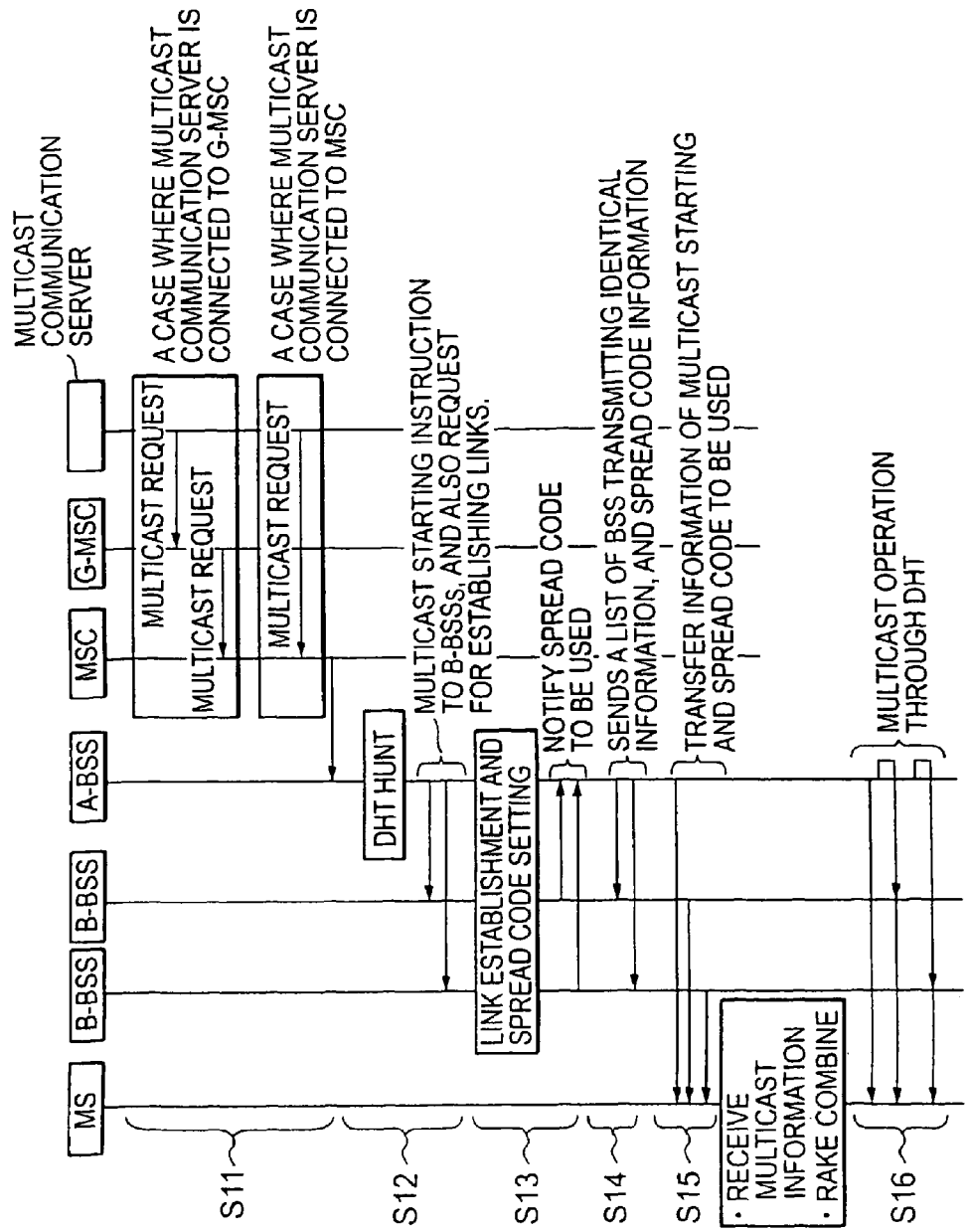

MULTICAST COMMUNICATION METHOD IN A CDMA MOBILE COMMUNICATION SYSTEM

CROSS-REFERENCE TO RELATED PATENT APPLICATIONS

Japan Priority Application 10-347549, filed Dec. 7, 1998 including the specification, drawings, claims and abstract, is incorporated herein by reference in its entirety. This application is a Continuation of U.S. application Ser. No. 11/790,181, filed Apr. 24, 2007, incorporated herein by reference in its entirety, which is a Divisional of U.S. application Ser. No. 11/357,985, filed Feb. 22, 2006, now U.S. Pat. No. 7,215,948, incorporated herein by reference in its entirety, which is a Continuation of U.S. application Ser. No. 10/397,524, filed Mar. 27, 2003, incorporated herein by reference in its entirety, which is a Continuation of U.S. application Ser. No. 09/456,377, filed Dec. 7, 1999, now U.S. Pat. No. 6,542,755, incorporated herein by reference in its entirety.

BACKGROUND OF THE INVENTION

1. Field of the Invention

The present invention relates to a multicast communication method to be performed in a CDMA (Code Division Multiple Access) mobile communication system.

2. Description of the Related Art

As a conventional multicast communication method in the CDMA mobile communication system, Japanese Patent Laid-Open Hei 10 (1998)-107770 discloses a multicast communication method in which service negotiations for the multicast communication is performed in a calling procedure between a mobile subscriber (abbreviated as MS, hereinafter) and a base station system (abbreviated as BSS, hereinafter) for the MS obtaining a spread code to be used for each multicast communication method.

Alternatively, in a plurality of BSSs, each multicast service data has been transmitted by using a broadcast channel of each BSS without any linkage to one another.

However, the following problems were inherent in the foregoing conventional multicast communication method in the CDMA mobile communication system.

(1) Regarding a system where a spread code is allocated for each multicast communication method by service negotiations in a calling procedure between the MS and the BSS, since a registration operation for the spread code is executed for each multicast service in MS that receives information, processing becomes complex. Thus, the system is not suitable for the multicast communication method of advertising use where information is simultaneously transmitted to a large number of MS. In addition, since the spread code must be fixed for each multicast communication method to be notified, dynamic use of limited number of spread codes is not allowed. Thus, this system lacks efficiency.

(2) Regarding a system where each multicast communication data is transmitted by each BSS by using respective broadcast channels, since the position of MS cannot be specified when a multicast operation is performed, transmission power in each BSS must be set to a maximum in order to enable possible MS located in the vicinity of a boundary to receive a signal sent from BSS. But if signal for data is transmitted by an output more than necessary, noises are generated in other MS. Consequently, a capacity of the entire system is reduced.

The present invention was made in order to solve the foregoing problems inherent in the prior art, and it is an object of the invention to provide a multicast communication method in a CDMA mobile communication system, which is capable of reducing transmission power in BSS and performing an efficient multicast operation for a large number of MS.

SUMMARY OF THE INVENTION

In order to achieve the foregoing object, in accordance with an aspect of the present invention, a multicast communication method in a CDMA mobile communication system, which comprises a plurality of mobile subscribers, a plurality of base station systems connected to the mobile subscribers by radio channels, a plurality of mobile switching centers connected to the base station systems and a multicast communication server connected to the mobile switching centers for providing information to be distributed to the mobile subscribers, the method is characterized in that each of the base station systems transmit information which is necessary for enabling the mobile subscriber to receive the multicasting information through respective broadcast channels to each of the mobile subscribers before multicasting information is transmitted.

The method comprises:

(1) sending a multicast request to at least one anchor base station system together with area information for multicasting;

(2) instructing a multicast request from the anchor base station system to at least one branch base station system necessary for covering multicasting area indicated by the area information;

(3) transmitting multicast starting information and spread code to be used for multicasting information to mobile subscribers through respective broadcast channels of the anchor base station system and the branch base station system; and (4) transmitting multicasting information from the anchor base station system and the branch base station system after proper time interval, during which the mobile subscribers have been ready for receiving multicasting information, has been elapsed.

The multicast communication method set forth above, wherein the anchor base station system uses a diversity handover trunk for establishing links to the branch base station systems.

The multicast communication method set forth above, wherein the method further comprises receiving multicasting information, at the mobile subscriber, transmitted from a plurality of base station systems, and performing a RAKE combine process for respective received signals.

In another aspect, the method comprises:

(1) sending a multicast request to at least one anchor base station system together with area information for multicasting;

(2) instructing a multicast request and link establishment request from the anchor base station system to at least one branch base station system necessary for covering multicasting area indicated by the area information;

(3) sending back information of link establishment completion and information of decided spread code for multicasting information at each base station system to the anchor base station system from the branch base station system, (4) transmitting multicast starting information together with a list indicating base station systems transmitting identical multicasting information and spread code to be used for multicasting information to mobile subscribers through respective broadcast channels of the anchor base station system and the branch base station system; and (5) transmitting multicasting information from the anchor base station system and the branch base station system after proper time interval, during which the mobile subscribers have been ready for receiving multicasting information, has been elapsed.

The multicast communication method in a CDMA mobile communication system set forth above, wherein the method further comprises:

(6) detecting, at the mobile subscriber, receivable base station systems listed in the list transmitted through the broadcast channel, and preparing reception of multicasting information by setting spread codes indicated in said list; and (7) receiving multicasting information, at the mobile subscriber, transmitted from a plurality of base station systems, and performing a RAKE combine process for respective received signals.

BRIEF DESCRIPTION OF THE DRAWINGS

FIG. 3 is a view illustrating a flowchart of a multicast communication method operation in the CDMA mobile communication system shown in FIGS. 1 and 2.

FIG. 4 is a view illustrating another flowchart of a multicast communication method operation in the CDMA mobile communication system shown in FIGS. 1 and 2.

DETAILED DESCRIPTION OF THE PREFERRED EMBODIMENTS

A preferred embodiment of the present invention will be described with reference to the accompanying drawings.

Figure 1:
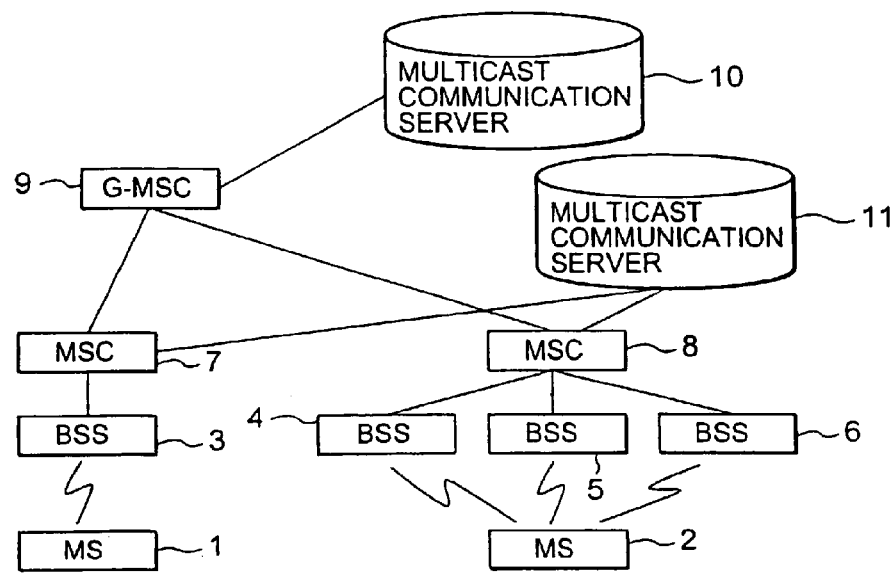
FIG. 1 is a view showing an embodiment of a multi-cast communication method in a CDMA mobile communication system according to the present invention.

FIG. 1 shows an embodiment of the CDMA mobile communication system in which the multicast communication method of the present invention is performed.

As shown in FIG. 1, the embodiment comprises a plurality of mobile subscribers (MSs 1 and 2), base station systems (BSSs 3 to 6) connected to the MSs 1 and 2 by radio channels for playing main roles of information multicasting to the MSs 1 and 2, mobile switching centers (MSCs 7 and 8) connected to the BSS 3 and also connected to the BSSs 4 to 6 for processing calls originated from the MSs 1 and 2 or calls incoming thereto, updating location information of the MSs 1 and 2, a gateway mobile switching center (G-MSC 9) connected to the MSCs 7 and 8 for performing connections to other networks, a multicast communication server 10 connected to the G-MSC 9, and also another multicast communication server 11 connected to the MSCs 7 and 8. Radio connections between the MS1 and the BSS 3, and between the MSs to the BSSs 4 to 6 are respectively established by a mobile communication procedure using the CDMA system.

The multicast communication servers 10 and 11 store contents information of multicast services, area information of each multicast service as a destination for multicasting information, and time for multicasting information. Timers are installed inside of server. These timers are set for each stored information, and by the timers, time for starting multicasting the stored information can be detected. Further, a service identifier is set for each multicast service so as to enable distributed information to be identified in the MSs 1 and 2.

Figure 2:
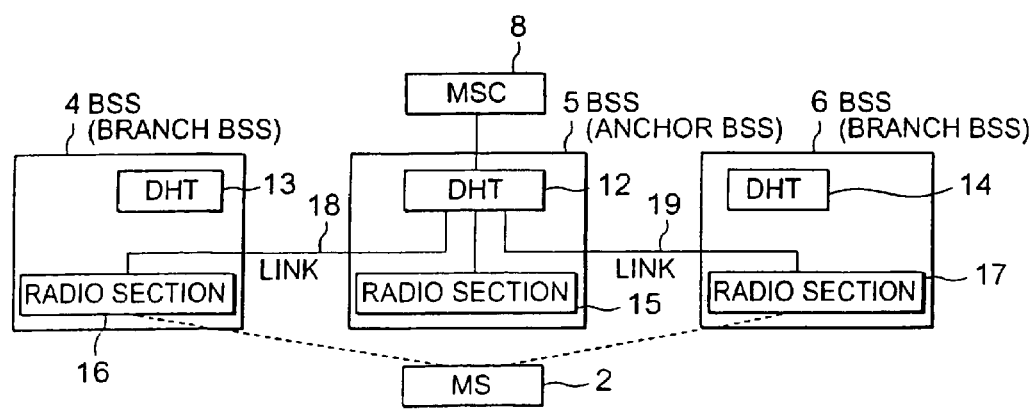
FIG. 2 is a view showing a specific example of a configuration including MS, BSS and MSC shown in FIG. 1.

FIG. 2 shows a specific example of the embodiment composed of the MS2, the BSSs 4 to 6 and the MSC 8 shown in FIG. 1.

As shown in FIG. 2, BSSs are classified into an anchor BSS 5 for playing main roles of information multi-casting, and branch BSSs 4 and 6 for subordinately contributing to information multicasting by means of link connection between each branch BSS and the anchor BSS 5. The anchor BSS 5 and branch BSSs 4 and 6 are connected to each other by links 18 and 19.

Functional sharing between the anchor BSS and the branch BSSs may be different for each multicast information. Also, even for identical information, functional sharing may be different for each multicasting information, for example between day and night.

The BSSs 4 to 6 respectively include diversity hand-over trunk (DHT) 12 to 14 provided to perform a soft hand-over operation in the CDMA system, and radio sections 15 to 17 provided to perform radio signal transmission and reception processing, and signal modulation and demodulation. The soft hand-over operation is one of unique features of the CDMA system. As the CDMA system uses the same frequency for radio communication, a MS can establish a plurality of radio channels to a plurality of BSSs as long as radio signal condition is good for each BSS. Therefore, as for the reverse channel signal, the BSS 5 can receive signal from the MS 2 not only via the radio section 15 of own BSS but also via the radio section 16 of the BSS 4 and the radio section 17 of the BSS 6, and the strongest signal is selected as the received signal at the DHT 12 in the BSS 5.

The area information to be transmitted, which has been stored in the multicast communication servers 10 and 11, contains bits of information regarding which BSS should be set as an anchor BSS and which BSS should be set as a branch BSS. The area information may be different for each multicasting information. For G-MSc 9 and MSCs 7 and 8, a different BSS configuration may be specified each time a multicast transmission request is transmitted. For example, even for identical multicast information, area information different between day and night may be specified.

In order to perform communications between BSSs 3 to 6 and MSs 1 and 2, the mobile communication system includes a broadcast channel provided to simultaneously inform system information or the like to a plurality of MSs, and a traffic channel provided to transmit specific data mainly to respective MS. MSs 1 and 2 include means provided to enable individual broadcast channel reception to be performed.

Next, a multicast communication method in the mobile communication system configured in the foregoing manner will be described.

FIG. 3 illustrates a flowchart of an embodiment of a multicast communication method in the CDMA mobile communication system shown in FIGS. 1 and 2.

First, in the multicast communication server 10 or 11, when a time comes to transmit accumulated data, information to be transmitted is notified together with area information to be transmitted to G-MSC 9 or MSCs 7 and 8, and a request is made to perform a multicast operation (step S1). Here, if G-MSC 9 receives a request transmitted from the multicast communication server 10 or 11, the request is transferred to MSCs 7 and 8 corresponding to the requested area information. In G-MSC 9, this request is copied when necessary, and transferred to a plurality of MSCs.

On the other hand, if MSCs 7 and 8 receive a request transmitted from the multicast communication server 10 or 11, the request is transferred to the anchor BSSs 3 and 5 corresponding to the requested area information. In the MSCs 7 and 8, this request is copied when necessary, and transferred to a plurality of anchor BSSs.

Upon having received the request transferred from the MSC 8, the anchor BSS 5 hunts the DHT 12 for a multicast operation, and informs the starting of information transmission to surrounding branch BSSs 4 and 6 corresponding to the area for information transmission. Then, links 18 and 19 are established for transmission of the notified information between branch BSSs 4 and 6 (step S2).

Then, in the branch BSSs 4 and 6, information necessary for transmitting information regarding a spread code or the like at the time of information transmission is selected and decided (step S3). A spread code may be different not only for performing a multicast operation for different information, but also for transmitting identical information at a different time. Then, in each of BSSs 4 to 6, the starting of information transmission by the multicast operation is notified through the broadcast channel to subordinate MS 2 (step S4). At this time, identification information indicating the selected spread code, information for deriving the spread code or the spread code itself is simultaneously notified. Also, information other than the spread code, which is necessary for data reception by the MS 2, is notified.

After the starting of the multicast operation has been notified to the MS 2, with an appropriate time interval, data is transmitted from the anchor BSS 5 through the DHT 12 to the branch BSSs 4 and 6. Subsequently, in a branch BSS that has received the data transmitted from the BSS 5, a multicast operation is performed by using the pre-selected and decided spread code (step S5).

In the MSS 1 and 2, the broadcast channel has been received for receiving the paging of an incoming call during waiting or system information. Upon having received the starting of the multicast operation through the broadcast channel, in the MSs 1 and 2, the identification information indicating the spread code, the information for deriving the spread code or the spread code itself used for information transmission is received through the broadcast channel of the same BSS.

If the identification information indicating the spread code or the information for deriving the spread code is received, based on the information, the spread code is introduced, and setting is made for data reception based on the spread code. Also, information other than the spread code, which is necessary for data reception, is received.

In the MSs 1 and 2, after the starting of the multi-cast operation has been recognized based on the information received through the broadcast channel, in order to detect whether the same information is transmitted from surrounding BSSs, a receiving operation is also performed for the notified information transmitted from another BSS. If the transmission of the same information from another BSS is recognized, then setting is made for data reception by the same procedure.

If MS can receive data from a plurality of BSSs, setting is made for performing the RAKE combine.

Other Embodiments

FIG. 4 illustrates a flowchart of another embodiment of a multicast communication method in the CDMA mobile communication system shown in FIGS. 1 and 2.

First, in the multicast communication server 10 or 11, when a time comes to transmit accumulated data, information to be transmitted is notified together with area information to be transmitted to the G-MSC 9 or the MSCs 7 and 8, and a request is made to perform a multicast operation (step S11). Here, if the G-MSC 9 receives a request transmitted from the multicast communication server 10 or 11, the request is transferred to the MSCs 7 and 8 corresponding to the requested area information. In the G-MSC 9, this request is copied when necessary, and transferred to a plurality of MSCs.

On the other hand, if the MSCs 7 and 8 receive a request transmitted from the multicast communication server 10 or 11, the request is transferred to the anchor BSSs 3 and 5 corresponding to the requested area information. In the MSCs 7 and 8, this request is copied when necessary, and transferred to a plurality of anchor BSSs.

Upon having received the request transferred from the MSC 8, the anchor BSS 5 hunts the DHT 12 for a multicast operation, and informs the starting of information transmission to surrounding branch BSSs 4 and 6 corresponding to the area for information transmission. Then, links 18 and 19 are established for transmission of the notified information between branch BSSs 4 and 6 (step S12).

Subsequently, in the branch BSSs 4 and 6, information necessary for transmitting information regarding a spread code or the like at the time of information transmission is selected and decided, and transmitted to the anchor BSS 5 (step S13). A spread code may be different not only for performing a multicast operation for different information, but also for transmitting identical information at a different time. Then, in the anchor BSS 5, the information transmitted from the branch BSSs 4 and 6 is combined with the information for data transmission, such as the spread code selected and set in the anchor BSS 5. Then, a list of BSS to which identical information is transmitted, and a list of information regarding the spread code or the like used by each BSS, are made, and notified to the branch BSSs 4 and 6 (step S14).

In the branch BSSs 4 and 6, when the starting of the multicast operation is notified, the list of BSS to which identical data is transmitted and the list of information regarding the spread code or the like used by BSS are also notified simultaneously, these lists having been received from the anchor BSS 5. Also, in the anchor BSS 5, when the starting of the multicast operation is notified, the list of BSS to which identical data is transmitted and the list of information regarding the spread code or the like used by BSS are simultaneously notified (step S15).

After the information transmitted from the BSSs 4 to 6 have been received, in the MS 2, detection is made as to existence of receivable BSS in the list of BSS to which received identical data is transmitted. If receivable BSS exists, then the information regarding the spread code or the like used by BSS, which has been received beforehand, is used, and setting is made to receive data from a plurality of BSSs.

With a proper time interval from processing in step S15, in the anchor BSS 5, data is transmitted through the DHT 12 to the branch BSS5 4 and 6. Then, in the BSS that has received the above data, a multicast operation is performed for the data by using the setting of pre-selected and decided spread code or the like (step S16)

Because of the foregoing configuration, the present invention is effective in the following respects.

(1) Signals transmitted from a plurality of base station systems can be combined by performing the RAKE combine in a mobile subscriber locating in the vicinity of the boundary of the cell. Accordingly, even if transmission power is set low in one base station system, a signal strength after RAKE combined in the mobile subscriber can be kept high. Thus, transmission power can be reduced in the base station system that performs a multicast operation.

(2) A multicast operation can be performed without any complex procedures such as a calling operation. A multicast operation can be efficiently performed for a large number of mobile subscribers.

What is claimed is:

1. A mobile station comprising:
a receiver that is configured to:
receive a notification of a starting of a multicast communication transmitted by a first base station system that receives a request for the multicast communication from a node after the node receives the request for the multicast communication from a gateway which receives the request for the multicast communication from a server;
receive information for a data reception of the multicast communication transmitted by the first base station system; and
perform the data reception of the multicast communication, wherein the data reception of the multicast communication is performed by receiving data of the multicast communication from the first base station system and a second base station system.

2. The mobile station according to claim 1, wherein the information for the reception includes information about a spread code.

3. The mobile station according to claim 1, wherein the information for the reception includes information about at least the second base station system.

4. The mobile station according to claim 1, wherein the receiver is configured to receive the data of the multicast communication from the first base station system and the second base station system based on the information received from the first base station system.

5. The mobile station according to claim 1, wherein the data reception of the multicast communication is performed by combining signals from the first base station system and the second base station system.

6. A mobile station comprising:
means for receiving a notification of a starting of a multicast communication transmitted by a first base station system that receives a request for the multicast communication from a node after the node receives the request for the multicast communication from a gateway which receives the request for the multicast communication from a server;
means for receiving information for a data reception of the multicast communication transmitted by the first base station system; and
means for performing the data reception of the multicast communication,
wherein the data reception of the multicast communication is performed by receiving data of the multicast communication from the first base station system and a second base station system.

7. The mobile station according to claim 6, wherein the information for the reception includes information about a spread code.

8. The mobile station according to claim 6, wherein the information for the reception includes information about at least the second base station system.

9. The mobile station according to claim 6, wherein the means for performing is configured to receive the data of the multicast communication from the first base station system and the second base station system based on the information received from the first base station system.

10. The mobile station according to claim 6, wherein the data reception of the multicast communication is performed by combining signals from the first base station system and the second base station system.

11. A control method for a mobile station, comprising:
receiving a notification of a starting of a multicast communication transmitted by a first base station system that receives a request for the multicast communication from a node after the node receives the request for the multicast communication from a gateway which receives the request for the multicast communication from a server;
receiving information for a data reception of the multicast communication transmitted by the first base station system; and
performing the data reception of the multicast communication,
wherein the data reception of the multicast communication is performed by receiving data of the multicast communication from the first base station system and a second base station system.

12. The control method for a mobile station according to claim 11, wherein the data of the multicast communication is received from the first base station system and the second base station system based on the information received from the first base station system.

13. The control method for a mobile station according to claim 11, wherein the data reception of the multicast communication is performed by combining signals from the first base station system and the second base station system.

* * * * *